(12) United States Patent
Fan et al.

(10) Patent No.: US 12,350,840 B2
(45) Date of Patent: Jul. 8, 2025

(54) REGION-BASED GRASP GENERATION

(71) Applicant: FANUC CORPORATION, Yamanashi (JP)

(72) Inventors: Yongxiang Fan, Union City, CA (US); Chi-Keng Tsai, Bloomfield Hills, MI (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 361 days.

(21) Appl. No.: 17/651,485

(22) Filed: Feb. 17, 2022

(65) Prior Publication Data

US 2023/0256602 A1 Aug. 17, 2023

(51) Int. Cl.
*B25J 9/16* (2006.01)
*B25J 13/08* (2006.01)

(52) U.S. Cl.
CPC .......... *B25J 9/1671* (2013.01); *B25J 9/1605* (2013.01); *B25J 9/1612* (2013.01); *B25J 9/1697* (2013.01);
(Continued)

(58) Field of Classification Search
CPC .......... G05B 2219/35134; G05B 2219/39466; G05B 2219/39001; G05B 2219/39514;
(Continued)

(56) References Cited

U.S. PATENT DOCUMENTS 9,669,543 B1 * 6/2017 Stubbs ................... B25J 9/1612
10,899,001 B2 1/2021 Sirkett et al.
(Continued)

FOREIGN PATENT DOCUMENTS

EP 2345515 B1 7/2011
EP 3020516 A2 * 5/2016 .............. B25J 13/02
(Continued)

OTHER PUBLICATIONS

A. Morales, T. Asfour, P. Azad, S. Knoop and R. Dillmann, "Integrated Grasp Planning and Visual Object Localization For a Humanoid Robot with Five-Fingered Hands," 2006 IEEE/RSJ International Conference on Intelligent Robots and Systems, Beijing, China, 2006, pp. 5663-5668, (Year: 2006).*

(Continued)

*Primary Examiner* — Adam R Mott
*Assistant Examiner* — James Miller Watts, III
(74) *Attorney, Agent, or Firm* — John A. Miller; Shumaker, Loop & Kendrick, LLP

(57) ABSTRACT

A region-based robotic grasp generation technique for machine tending or bin picking applications. Part and gripper geometry are provided as inputs, typically from CAD files, along with gripper kinematics. A human user defines one or more target grasp regions on the part, using a graphical user interface displaying the part geometry. The target grasp regions are identified by the user based on the user's knowledge of how the part may be grasped to ensure that the part can be subsequently placed in a proper destination pose. For each of the target grasp regions, an optimization solver is used to compute a plurality of quality grasps with stable surface contact between the part and the gripper, and no part-gripper interference. The computed grasps for each target grasp region are placed in a grasp database which is used by a robot in actual bin picking operations.

20 Claims, 6 Drawing Sheets

(52) U.S. Cl.
CPC ..... *B25J 13/08* (2013.01); *G05B 2219/35134* (2013.01); *G05B 2219/39001* (2013.01); *G05B 2219/39466* (2013.01)

(58) Field of Classification Search
CPC ........... G05B 2219/39536; G05B 2219/39539; G05B 2219/39542; G05B 2219/39543; G05B 2219/39545; G05B 2219/39548; G05B 2219/39482; G05B 2219/39113; G05B 2219/39484; G05B 2219/39473; B25J 13/08; B25J 15/08; B25J 9/1605; B25J 9/1612; B25J 9/1671; B25J 9/1697
USPC ........................................................ 700/264
See application file for complete search history.

(56) References Cited

U.S. PATENT DOCUMENTS

| | | | |
|---|---|---|---|
| 2013/0184870 A1* | 7/2013 | Ota | B25J 9/1669 700/262 |
| 2021/0308866 A1* | 10/2021 | Zhu | B25J 9/1612 |
| 2022/0016765 A1* | 1/2022 | Ku | B25J 9/1612 |

FOREIGN PATENT DOCUMENTS

| | | | | |
|---|---|---|---|---|
| JP | 2022009697 A | * | 1/2022 | .............. G01B 11/02 |
| WO | WO-2022250657 A1 | * | 12/2022 | .............. B25J 9/1605 |

OTHER PUBLICATIONS

Y. Fan, H.-C. Lin, T. Tang and M. Tomizuka, "Grasp Planning for Customized Grippers by Iterative Surface Fitting," 2018 IEEE 14th International Conference on Automation Science and Engineering (CASE), Munich, Germany, 2018, pp. 28-34, doi: 10.1109/COASE.2018.8560361. (Year: 2018).*

A. T. Miller, S. Knoop, H. I. Christensen and P. K. Allen, "Automatic grasp planning using shape primitives," 2003 IEEE International Conference on Robotics and Automation (Cat. No. 03CH37422), Taipei, Taiwan, 2003, pp. 1824-1829 vol. 2, doi: 10.1109/ROBOT.2003.1241860. (Year: 2003).*

A. Morales, T. Asfour, P. Azad, S. Knoop and R. Dillmann, "Integrated Grasp Planning and Visual Object Localization For a Humanoid Robot with Five-Fingered Hands," 2006 IEEE/RSJ International Conference on Intelligent Robots and Systems, Beijing, China, 2006, pp. 5663-5668 (Year: 2003).*

Translation of EP-3020516-A2 (Year: 2016).*

Translation of JP-2022009697-A (Year: 2022).*

Kent, D., Behrooz, M. & Chernova, S. Construction of a 3D object recognition and manipulation database from grasp demonstrations. Auton Robot 40, 175-192 (2016) (Year: 2016).*

Ten Pas, Andreas, "Grasp Pose Detection in Point Clouds" The International Journal of Robotics Research vol. 36, Issue 13-14, Dec. 2017, pp. 1455-1473 (Year: 2017).*

U.S. Appl. No. 17/502,230, titled Grasp Generation for Machine Tending, filed Oct. 15, 2021.

* cited by examiner

REGION-BASED GRASP GENERATION

BACKGROUND

Field

The present disclosure relates generally to a method for generating quality grasp data for robot grasping of parts and, more particularly, to a method for robot grasp generation for machine tending and bin picking applications in which part and gripper geometry are provided as inputs, user definition of target grasp regions on the part is provided, and an optimization solver is used to compute a plurality of quality grasps with part-gripper surface contact on each of the target grasp regions of the part.

Discussion of the Related Art

The use of industrial robots to perform a wide range of manufacturing, assembly and material movement operations is well known. One such application is a pick and place operation, such as where a robot picks up individual parts from a bin and places each part at a prescribed location for further processing or packaging. A specific example of a pick and place operation is the machine tending application, where parts or workpieces are dropped into the bin and need to be grasped by the robot and placed into a machining station. The machining station may be open or fully enclosed with automated doors, and the machining station must typically grasp the part in a particular manner in order to allow the machining operations (drilling, milling, thread tapping, etc.) to be performed on the part.

In applications such as described above, a vision system (one or more cameras) is typically used to identify the position and orientation of individual parts in the bin. Then a specific robotic grasp is identified to be used on a selected part, where the grasp may be chosen from a pre-computed database of grasps which have been generated for the particular part geometry and the particular gripper geometry.

Because of the specific grasping requirements of the machining station, the corresponding robotic grasp generation has traditionally been done manually. In this type of manual teaching, a production robot and machining station are used, and an expert operator uses either a teach pendant or hand guidance to teach the robot to grasp the part. This must be done many times in order to define suitable grasps for the part in many different orientations in the bin. This manual teaching technique is slow and inefficient, and also very costly because it requires a full workcell (with robot and machining station) for teaching, which in turn prevents the workcell from being used for actual part production.

Other grasp generation techniques are known which can automatically generate many grasp candidates. However, these techniques have downsides such as being extremely computationally expensive and slow, or making simplifications which result in computed grasps of low grasp quality. In addition, existing techniques have no automated way of accounting for the fact that the robot must grasp the part such that the part can be loaded into and grasped by the machining station.

Another example of a pick and place operation is where the robot grasps an individual part from a bin of parts, and places the grasped part on a conveyor for movement to a subsequent station, or in a container for shipping. In these cases, it is still advantageous for the robot to grasp the part in a manner which is amenable to the part being placed on the conveyor or in the container in a specified pose. Because of this, certain regions of the part are preferred for grasping, but it is difficult for a computer algorithm to identify preferred grasping regions on the part.

In light of the circumstances described above, there is a need for a robot grasp generation technique which computes high quality grasp candidates without manual teaching, is computationally efficient, and provides stable grasps on regions of the part which are compatible with the orientation requirements of the subsequent placement of the part at its destination.

SUMMARY

In accordance with the teachings of the present disclosure, a region-based robotic grasp generation technique for machine tending or bin picking applications is presented. Part and gripper geometry are provided as inputs, typically from CAD files, along with gripper kinematics. A human user defines one or more target grasp regions on the part, using a graphical user interface displaying the part geometry. The target grasp regions are identified by the user based on the user's knowledge of how the part may be grasped to ensure that the part can be subsequently placed in a proper destination pose. For each of the target grasp regions, an optimization solver is used to compute a plurality of quality grasps with stable surface contact between the part and the gripper, and no part-gripper interference. The computed grasps for each target grasp region are placed in a grasp database which is used by a robot in actual bin picking operations.

Additional features of the presently disclosed methods will become apparent from the following description and appended claims, taken in conjunction with the accompanying drawings.

DETAILED DESCRIPTION OF THE EMBODIMENTS

The following discussion of the embodiments of the disclosure directed to a region-based grasp generation technique for robotic part picking applications is merely exemplary in nature, and is in no way intended to limit the disclosed techniques or their applications or uses.

The use of industrial robots for picking parts from a source and placing them at a destination is well known. In a typical pick and place operation, a supply of parts is provided in a bin, such as a bin containing a random pile of parts which have been cast or partially assembled, where the parts need to be picked up from their random poses in the bin and placed in a particular pose at a destination location. Machine tending is a particular type of robotic part picking and placement having unique requirements, while other bin picking and placement applications also typically require the part to be placed in a particular pose at the destination.

Figure 1:
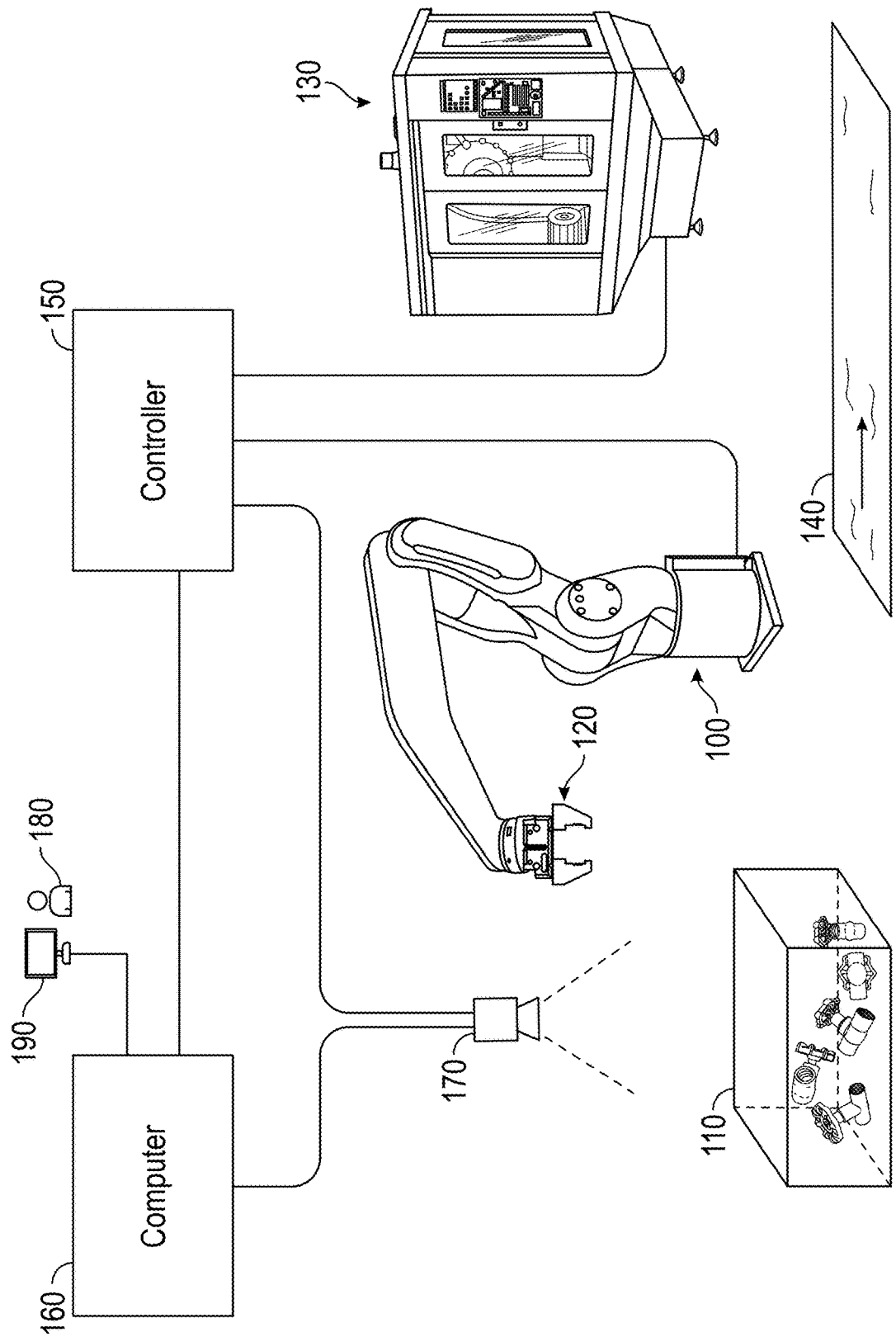
FIG. 1 is an illustration of a robotic grasp generation and part grasping system, where a database of quality grasps are computed on user-defined target grasp regions of a part, and an industrial robot picks a part from a bin using one of the grasps from the database and places the part in a machining station or on a conveyor for further processing, according to an embodiment of the present disclosure.

FIG. 1 is an illustration of a robotic grasp generation and part grasping system, according to an embodiment of the present disclosure. In the system of FIG. 1, a database of quality grasps on user-defined target grasp regions of a part are computed in advance, and an industrial robot then picks parts from a bin using one of the grasps from the database and places the parts at a destination location for further processing.

In one application of the system of FIG. 1, an industrial robot 100 picks a part from a bin 110 and places the part in a machining station 130 for processing, then removes the finished part from the machining station 130 after processing and places the finished part on a conveyor 140 where it is carried away for further processing or packaging. In another application of the system, the robot 100 picks a part from the bin 110 and places the part directly on the conveyor 140 to be carried away. The robot 100 has a gripper 120 with fingers which open and close to grasp a part. The fingers typically have a curved contact surface suitable for grasping the parts which are being handled by the robot 100. The gripper finger shape is discussed further below.

Motion of the robot 100 is controlled by a controller 150, which communicates with the robot 100 via a cable (shown) or wirelessly. The controller 150 provides joint motion commands to the robot 100 and receives joint position data from encoders in the joints of the robot 100, as known in the art. The controller 150 also provides commands to control operation of the gripper 120 (grip/ungrip commands and gripper opening width).

During real-time bin picking operations by the system of FIG. 1, whether in a machine tending or other pick and place application, the robot 100 must grasp a selected part from the bin 110—based on images of the bin 110 from a camera 170—such that the gripper 120 closes its fingers on the selected part according to a chosen stable grasp. The grasp includes the position and orientation of the gripper 120 with respect to the selected part, along with a gripper finger width. In order to maximize bin picking productivity, it is known to pre-compute a grasp database containing many high-quality, stable grasps, and one of the grasps from the database is chosen for each part which is selected during real-time bin picking.

A computer 160, including a processor and memory/storage, is in communication with the controller 150. The computer is configured to pre-compute the grasp database based on input from a user 180 via a user interface 190. The computation of the grasp database is the subject of the present disclosure, and is discussed in detail below.

In one implementation embodiment of the real-time bin picking, the controller 150 performs the part selection and grasp computation based on the images from the camera 170, and using the grasp database transferred from the computer 160. Using the grasp data, the controller 150 computes robot motion instructions which cause the gripper 120 to grasp a part and move the part into the machining station 130 or other destination. The controller 150 then provides instructions to the robot 100 which picks and places the selected part. In this embodiment, the computer 160 is not used for robotic bin picking operations; rather, the computer 160 is used only for grasp generation, and provides the grasp database to the controller 150 in advance of the robotic operations.

In another implementation embodiment, the computer 160 performs the real-time part selection and grasp computation based on the images from the camera 170, and using the grasp database which resides on the computer 160. In this embodiment, the computer 160 communicates the grasp data (gripper position/orientation/width) to the controller 150 for each individual bin pick, and the controller 150 computes robot motion commands and provides instructions to the robot 100 which picks and places the selected part.

Either of the implementation embodiments described above may be used for a particular application, based on specific application requirements, computing power of the controller 150, etc. For the remainder of the discussion which follows, the computer 160 will be described as being used for the region-based grasp generation according to the present disclosure, while the controller 150 will be described as computing a grasp in real time using the grasp database and controlling the robot to execute the grasp.

The camera 170 is typically a three-dimensional (3D) camera providing both color image data and pixel depth map data, but may be some other type of 3D sensor which provides data suitable for determining the pose (position and orientation) of parts in the bin 110. More than one of the cameras 170 may be used to provide more robust depth and image data which aids in part pose determination, and also allows for non-vertical gripper approach angles. In some applications, the bin 110 may contain only one part, which could be in any position and orientation. This would be the case if the parts are processed by the machining station 130 at the same rate that they arrive in the bin 110. Alternately, the bin 110 may contain several parts (as shown in FIG. 1), or a substantial pile of parts. In any case, a best quality grasp candidate is chosen from the pre-computed grasp database based on the image data from the camera 170.

In machine tending applications, the controller 150 is also in communication with the machining station 130. At a minimum, the controller 150 communicates sufficiently with the machining station 130 to allow the loading and unloading of parts by the robot 100. That is, when the machining station 130 is ready for a new part to be loaded, the controller 150 commands the robot to grasp a part from the bin 110 and place the part in the grasping tool of the machining station 130 in the prescribed orientation, while verifying that the doors of the machining station 130 are open. The robot 100 then withdraws from the machining station 130 and waits for the machining operations to be completed on the part. When the machining station 130 signals to the controller 150 that the finished part is ready to be removed from the machining station 130, the robot 100 reaches into the machining station 130 and grasps the part (which is in a known pose), the machining station 130 ungrasps the part, and the robot 100 moves the part to the conveyor 140. The conveyor 140 is merely exemplary; the robot 100 may place the finished part in another bin, in a shipping container or elsewhere after removal from the machining station 130. After dropping off the finished part, the robot 100 then returns to the bin 110 to select another part to load into the machining station 130. The next part grasp is determined based on new image data provided by the camera 170.

In bin picking applications not involving a machining station, the robot grasps a part from the bin 110 and places the part on the conveyor 140 or in another destination such as a shipping container, then returns to the bin 110 to select another part using a grasp which is computed based on new image data provided by the camera 170.

Teaching a robot to recognize and grasp an individual part in a bin full of parts, in real time, has always been challenging. In order to improve the speed and reliability of robotic part picking operations, it is known to pre-compute grasps for a specified gripper grasping a particular part in a variety of poses. This pre-computing of grasps is known as grasp generation, and the pre-computed (generated) grasps are then used to make decisions in real time during robotic part picking operations. This concept of grasp generation was discussed above with respect to FIG. 1.

One traditional grasp generation method manually teaches picking points on known 3D features on objects. This method requires significant time spent for various reasons, including the fact that each grasp must be individually taught, and the fact that teaching a single grasp with precise alignment on the workpiece can take a very long time—10 minutes or more. Because of the difficulties of using manual grasp teaching, learning-based grasp detection methods have become popular due to their ability to generate grasps autonomously and adapt to unknown objects.

However, existing learning-based grasp generation methods also have downsides. One known learning-based technique uses a mathematically rigorous grasp quality to search for grasp candidates before feeding these candidates to a convolutional neural network (CNN) classifier, but is computationally expensive, and the solution may not be optimal in real world situations due to simplifications used in the optimization. Another method uses empirical trials to collect data producing realistic grasps, but this method usually requires tens of thousands of robot hours with complicated force controls, and any change of the gripper requires a repeat of the whole process. These and other shortcomings—including long data collection times, heavy computational loads for training, and difficulty adapting to different shapes—have limited the use of learning-based grasp generation methods. Furthermore, existing methods generally cannot accommodate user grasp region preferences.

Another grasp generation technique was disclosed in U.S. patent application Ser. No. 17/502,230, titled GRASP GENERATION FOR MACHINE TENDING, filed Oct. 15, 2021 and commonly assigned with the present application, and herein incorporated by reference in its entirety. The aforementioned application is hereinafter referred to as "the '230 application".

The '230 application describes a grasp generation technique which can be automatically applied to any combination of gripper and part designs, produces a large number of realistic grasps in an efficient optimization computation, and can also simulate the physical act of grasping an individual part from a pile of parts jumbled together in a bin as is often encountered in real world robotic part picking operations. To increase the robustness of the grasps, a mathematically rigorous grasp quality is used, and the contacts are modeled as surfaces. A specially designed optimization routine is used to solve the computations efficiently. While the techniques of the '230 application efficiently provide a large number of quality grasps, the grasps are spread out over all areas of the part. In real pick and place applications, many grasps of the part by the robot are unsuitable to meet the requirement to subsequently place the part in a particular pose at the destination.

The present disclosure overcomes the shortcomings of existing grasp generation techniques by providing an efficient grasp generation method which incorporates human knowledge of where (upon what portion(s) of a part) the robot should grasp. By limiting the generated grasps to certain target grasp regions of the part, the disclosed techniques enable automatic and efficient generation of stable grasps which are sufficient in number and are known to be applicable to the pick and place operation being performed.

Figure 2:
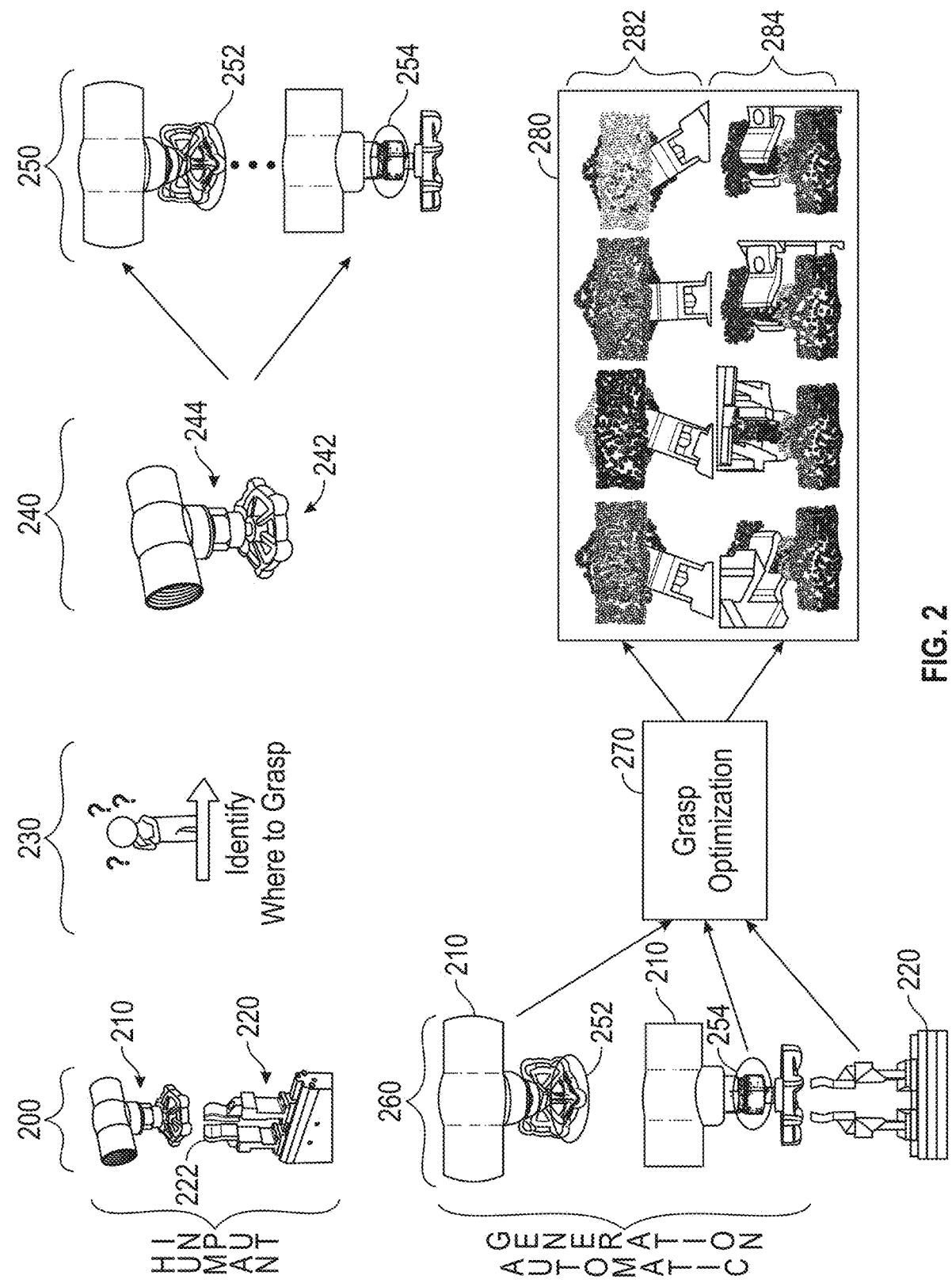
FIG. 2 is an illustrated flowchart diagram of steps included in a region-based grasp generation process used to create a database of grasps on target grasp regions of a part, where the grasp database is then used in the part grasping system of FIG. 1, according to an embodiment of the present disclosure.

FIG. 2 is an illustrated flowchart diagram of steps included in a region-based grasp generation process used to create a database of grasps on target grasp regions of a part, where the grasp database is then used for robot bin picking in the part grasping system of FIG. 1, according to an embodiment of the present disclosure. Inputs to the grasp generation process, provided at a step 200, include a part model 210 and a gripper model 220. The part model 210 is a 3D surface or solid model of the part which is to be picked from the bin 110 by the robot 100 (of FIG. 1). The part model 210 is typically created in a computer aided design (CAD) system. The part model 210 shown in FIG. 2 depicts a pipe valve which is used as the part throughout the present disclosure.

The gripper model 220 includes surface or solid shape data for gripper fingers 222. The gripper model 220 illustrates a two-finger parallel gripper, however, other types of gripper designs may be used. The gripper fingers 222 include finger tips typically having a concave shape which is selected to correspond with the part (e.g., the pipe valve) which is being grasped by the robot. That is, the finger tips can produce a stable grasp on many different parts of the pipe valve—such as the handle, the coupling body, the valve stem collar, etc. Different grippers having different designs of the finger tips may be employed based on the shape of the part being grasped. The shape of the finger tips (i.e., the contact surfaces) is used in the grasp quality optimization computations discussed below.

The gripper model 220 also includes gripper actuation parameters—such as geometric definition of an actuator having an axis along which the fingers translate to provide a finger grasp width, which is the distance that the fingers 222 are separated by the gripper actuator. The grasp width may be commanded by the controller 150 to increase before part grasping and to decrease to grasp the part. The mounting orientation of the gripper actuator on the wrist of the robot 100 is known, and the wrist rotation angle is known, which means that the translational axis of the fingers 222 relative to the robot wrist is known, which in turn enables the locations of the finger tips in space to be computed based on the grasp width.

The part model 210 and the gripper model 220 are provided to a step 230, where a human expert (the user 180 of FIG. 1) defines target grasp regions on the part. The target grasp regions are regions of the part where grasps will be generated. One or more target grasp regions may be defined by the user, such as by using a graphical user interface (the user interface 190) in which the solid model of the part may be manipulated (e.g., rotated in three dimensions), and geometric regions of the part may be selected using lasso or box-type selection tools, for example. Any suitable selection method may be used to define the target grasp region(s). The entire part may also be defined as a single target grasp region, if the user determines that the entire part is suitable for grasping for a particular application.

At step 240, the part model 210 is shown with a first target grasp region (a portion of the handle) indicated by arrow 242, and a second target grasp region (the stem/collar) indicated by arrow 244. To be clear, the target grasp regions selected by the user are defined as three-dimensional portions of the part—such as the entire handle, or just a certain part of the handle, etc. Points on the outer surface of each target grasp region will be used to model the contact with the gripper fingers 222 in the grasp optimization step, discussed below.

After the one or more target grasp regions are designated by the user at the steps 230-240, the target grasp regions are stored to a region database, shown at step 250. In the present example, the region database includes a first target grasp region 252 which includes a portion of the valve handle. Specifically, the target grasp region 252 is a wedge-shaped sector of about 120°, or one-third of the handle, located on a side of the part where the gripper actuator and fingers will not interfere with the valve body. The region database also includes a second target grasp region 254 which includes the stem/collar portion (in its circumferential entirety) of the part. The target grasp regions 252 and 254 are depicted with surface points which will be used later in the grasp optimization computation.

At step 260, inputs are provided to a grasp optimization computation box 270 to compute a plurality of stable grasps on each of the target grasp regions. The inputs at the step 260 include the part model 210, the target grasp regions from the region database (in this case, the target grasp region 252 and the target grasp region 254), and the gripper model 220. Other parameters defined by the user at the step 230 are also provided as inputs to the grasp optimization computation box 270—such as the number of grasps to compute for each target grasp region, optimization parameters, and designation of gripper contact surfaces on the fingers 222 of the gripper model 220. Default values may be selected for the optimization parameters, and designation of gripper contact surfaces only needs to be done once for a particular gripper, which simplifies the user input definition at the step 230. The most important user inputs are simply the target grasp regions and the number of grasps to compute.

The details of the grasp optimization computation in the box 270 are discussed below with reference to FIGS. 3, 4 and 5. The output of the grasp optimization box 270 is a grasp database depicted in box 280. The grasp database includes a plurality of high-quality, stable grasps for each of the designated target grasp regions. In the box 280, four grasps are depicted at reference 282 for the target grasp region 252. It can be seen that the four grasps at the reference 282 all have the gripper fingers 222 grasping the valve handle on the sector indicated by the target grasp region 252, where the gripper fingers have different orientation angles and slightly different positions in each of the grasps. These different grasps provide many options for selecting a quality grasp on the part during actual robotic bin picking operations, where many parts are typically randomly piled in the bin.

In the box 280, four grasps are also depicted at reference 284 for the target grasp region 254. It can be seen that the four grasps at the reference 284 all have the gripper fingers 222 grasping the stem/collar portion of the part, as designated by the target grasp region 254, where the gripper orientation relative to the part is different in each of the grasps. These different grasps provide many additional options for selecting a quality grasp on the part during actual robotic bin picking operations. Only four grasps for each target grasp region are shown in the box 280 by way of example; however, it is to be understood that a larger number of grasps (such as 10, 20 or 50) may be readily designated by the user, automatically generated at the box 270 and placed in the grasp database at the box 280.

Figure 3:
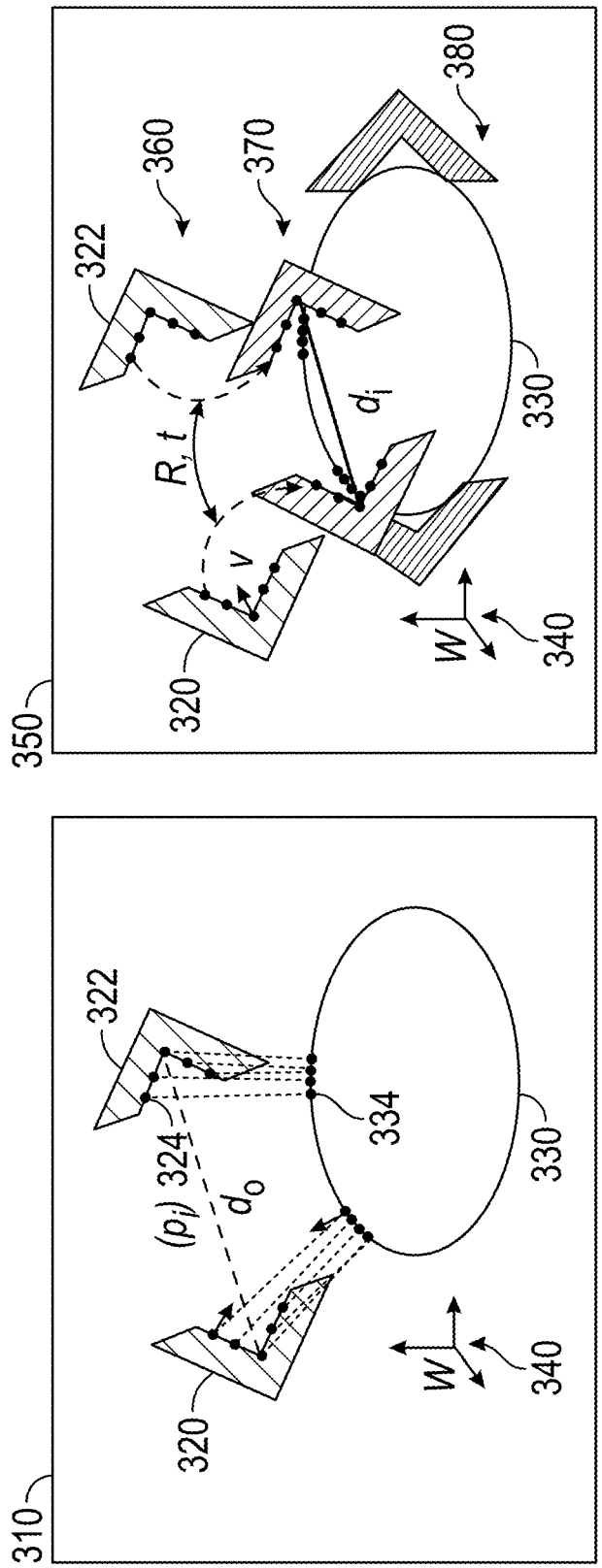
FIG. 3 is an illustration of the basic principles used in a part-gripper surface fitting algorithm which is employed in the grasp optimization box of FIG. 2, according to an embodiment of the present disclosure.

FIG. 3 is an illustration of the basic principles used in a surface fitting algorithm which is employed in the grasp generation process in the box 270 of FIG. 2, according to an embodiment of the present disclosure. Shown in box 310 is an initial configuration of gripper parts 320 and 322 and an object 330 which is to be grasped. The gripper parts 320/322 correspond with the tips of the fingers 222 of the gripper model 220 of FIG. 2, which in turn represent the gripper 120 of FIG. 1. That is, the gripper parts 320/322 may be opened (separated) and closed, and the entire gripper may be translated and rotated, to achieve a best quality grip during optimization computations. The gripper parts 320/322 are separated by a distance do at the initial configuration shown in the box 310. The object 330 corresponds with one of the target grasp regions on the part model 210 of FIG. 2.

A fixed coordinate frame 340 is defined. The coordinate frame 340 may be defined in any suitable manner—such as a bin coordinate frame which has an origin and orientation defined relative to a corner of the bin 110, for example. The coordinate frame 340 could be defined to be fixed at any location and orientation in the workspace of the robot 100 of FIG. 1.

A set of points $p_i$ is defined on the surfaces of the gripper parts 320/322, using any suitable sampling density. The points $p_i$ are defined on any portion of the gripper parts 320/322 (i.e., the tips of the fingers 222 of the gripper model 220) which may contact the object 330 for grasping; this is defined at the step 230 of FIG. 2 by user selection of gripper contact surfaces (such as triangular patches on the surface of the fingers 222 of the gripper model 220). One of the sampling points $p_i$ on the gripper part 322 is indicated by reference number 324; other instances of the sampling points $p_i$ are also shown without numbers. Sampling points are also defined on the surface of the object 330 (including the target grasp region). FIG. 3 is illustrated as a 2D cross-section for clarity. However, the surfaces of the gripper parts 320/322 and the object 330 are all three dimensional, as are the coordinates of the sampling points $p_i$.

For each of the points $p_i$ (324) on the gripper parts 320/322, a nearest neighbor point 334 on the surface of the object 330 is determined. The nearest neighbor point 334 is determined by computing the shortest 3D distance from the point 324 to a sampling point on the surface of the object 330, in a manner known in the art. From the points $p_i$ on the gripper parts 320/322 and the corresponding nearest neighbor points, an optimization computation is performed to update the gripper translation, rotation and opening so that the grasp quality is improved and interference is reduced.

Shown in box 350 are the gripper parts 320/322 and the object 330 at the initial configuration (indicated by arrow 360), an intermediate configuration (indicated by arrow 370), and a final configuration (indicated by arrow 380). The movement of the gripper parts 320/322 in the configurations 360/370/380 depict the behavior of the iterative optimization loop in finding a quality grasp. The initial configuration may be such that there is no contact between the object 330 and the gripper parts 320/322, or the initial configuration may include part-gripper contact or interference; the disclosed grasp optimization method can handle either condition. In the initial configuration 360 shown in FIG. 3, there is no grasp contact and no interference between the gripper parts 320/322 and the object 330. Therefore, the position of the gripper parts 320/322 for the next intermediate configuration 370 can be computed by simply moving the points $p_i$ on the gripper parts 320/322 toward their corresponding nearest neighbor points on the object 330. The movement of the gripper parts 320/322 from the initial configuration 360 to the intermediate configuration 370 is defined in terms of a transformation $\mathcal{T}$ including a rotational transformation R, a translational transformation t, and a gripper width transformation q.

From the initial configuration 360 to the intermediate configuration 370, the gripper parts 320/322 have been translated (via t) downward and slightly to the right, and the gripper width has been reduced (via q) from $d_0$ to $d_i$, while very little rotation (R) has been applied. At the intermediate configuration 370, the points $p_i$ on the gripper parts 320/322 are in their new locations, and corresponding nearest neighbor points can be computed accordingly. At the intermediate configuration 370, significant interference exists between the the gripper parts 320/322 and the object 330. Thus, the optimization computation will cause the next intermediate configuration (not shown) to apply a transformation $\mathcal{T}$ (especially increasing the gripper width via the transformation q) which attempts to resolve the interference and improve the grip quality. Ultimately, the optimization computation, discussed in detail with respect to FIG. 4, will converge to a locally optimized grasp shown as the final configuration 380. In the final configuration 380, there are no interferences, and multiple parts of the gripper surfaces are in contact with or in proximity to the object 330.

Figure 4:
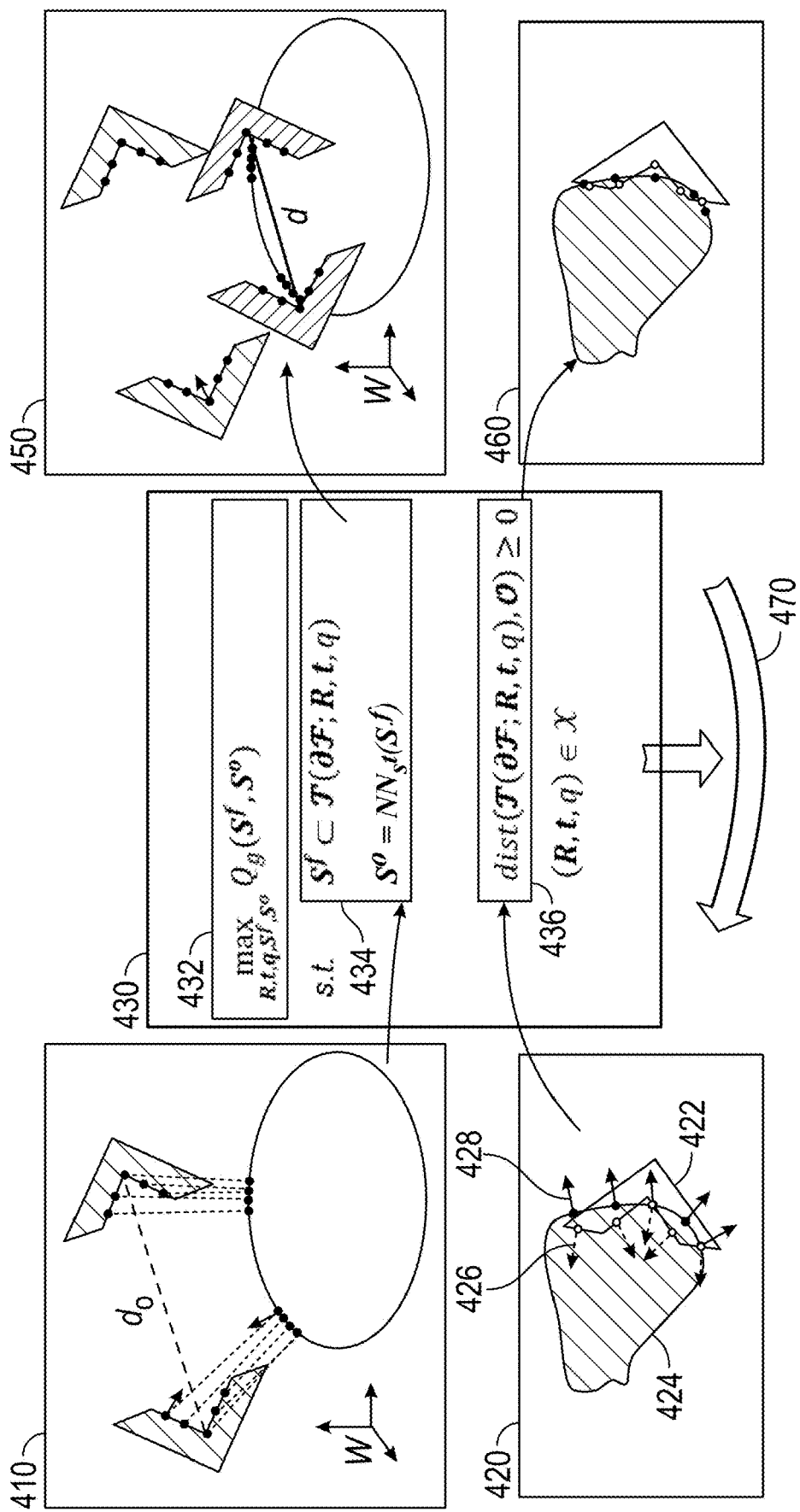
FIG. 4 is an illustration of the grasp optimization computation employed in the grasp optimization box of FIG. 2, including surface fitting, collision avoidance and the use of target grasp regions on the part, according to an embodiment of the present disclosure.

FIG. 4 is an illustration of the grasp optimization computation performed in the box 270 of the region-based grasp generation process shown in FIG. 2, according to an embodiment of the present disclosure. The grasp optimization computation of FIG. 4 includes surface fitting, collision avoidance and the use of target grasp regions on the part. At box 410, a configuration of the gripper parts relative to the object is defined, gripper surface points $p_i$ are defined, and corresponding nearest neighbor points on the object are defined. The scene depicted in the box 410 corresponds with the initial configuration box 310 of FIG. 3, where the initial pose of the gripper with respect to the object is defined randomly within some range of translational distances, rotational angles and gripper opening widths. In other words, the initial position and orientation of the gripper fingers is defined within some predefined sampling space around the points on the current target grasp region. The random initial gripper pose ensures that a variety of grasps are provided by the optimization computation.

Throughout the discussion of the optimization computation, the gripper (finger) surfaces as defined by the points $p_i$ are referred to as $S^f$, while the object surface (all sampling points on the object for which grasps are currently being computed, and the nearest neighbor points specifically) is referred to as $S^o$. The target grasp region on the object is referred to as $S^t$.

Box 420 contains a general illustration of how collisions between one of the gripper finger surfaces $S^f$ and the object surface $S^o$ are identified. In one embodiment, a general mesh of points $p_i$ is applied to the gripper finger surface $S^f$—including inner surfaces of the gripper fingers 222 (the portion of the gripper most commonly used for grasping an object), and also outer surfaces and side surfaces of the gripper fingers if identified by the user on the gripper model 220. Providing mesh points on all surfaces of the gripper fingers improves the robustness of the collision avoidance constraint. For visual clarity, the illustration in the box 420 includes contact points only on the inner surfaces of the finger 222, and FIG. 4 again includes 2D illustrations of the gripper and object, collisions and contacts. It is to be understood that the gripper and part models, point coordinates and transformations are all three dimensional in nature.

In the box 420, a gripper part 422 and an object 424 are shown. The object 424 may of course have any general shape, as illustrated. For interference check purposes, the object 424 represents the entire part, not just the target grasp region which is currently being computed. Because the part/object and the gripper were defined by the 3D models 210 and 220 discussed earlier, each of the points on the gripper finger surface $S^f$ and the object surface $S^o$ has a local surface normal, as shown by vectors 426 and 428, respectively. The local surface normal vectors are used in the first embodiment of collision avoidance calculations, where the vectors are used to calculate an amount of penetration of the gripper into the object, and vice versa, where this penetration or interference is penalized in a constraint function. The local surface normal vectors are also used in grasp quality calculations, as normal forces are present even in the absence of friction, whereas tangential forces are a function of friction coefficient.

In another, preferred embodiment of collision avoidance or interference check calculations, a signed distance field method is used. In the signed distance field method, the entirety of the gripper part 422 is modeled as a 3D grid of cells or voxels (in FIG. 2, this would include the gripper fingers 220). The signed distance field grid also extends to some volume of space surrounding the gripper. For example, each of the gripper fingers 220 of FIG. 2 could be contained in a brick-shaped hexahedron of signed distance field cells. The signed distance field cells which are on the surface of the gripper have a distance value d of zero. Signed distance field cells which are inside the gripper have a negative value of d denoting how many cells distant they are from the surface, while cells which are outside the gripper have a positive value of d denoting how many cells distant they are from the gripper surface. These signed distance field modeling conventions are known in the art.

The object 424 is modeled by the sampling points discussed above with respect to FIG. 3. Using the signed distance field method, at each iteration (pose of the gripper with respect to the object), each sampling point on the object 424 is checked to determine which cell of the gripper signed distance field it occupies, if any. This calculation can be performed very quickly for all of the sampling points on the object 424, leading to a determination of which points on the object 424 interfere with the gripper 422, and what the amount of gripper-object penetration is. The amount of interference or penetration is determined based on the negative value of d for cells inside the gripper which contain one or more sampling point on the object 424. In this way, the signed distance field method provides interference check results which can be used in the overall optimization model of FIG. 4.

The illustration in the box 420 does not show a signed distance field grid model of the gripper 422. However, the illustration in the box 420 should be considered to be generally representative of the collision avoidance or interference check portion of the presently disclosed grasp generation method, whether the surface point (first) embodiment is used, or the signed distance field (second) embodiment is used.

In box 430, the grasp searching problem is modeled as an optimization, and one iteration is computed. To compute stable grasps, surface contact area is maximized in the optimization. Gripper-object collision is also penalized in the optimization to avoid penetration, as mentioned above. The entire object is considered for collision avoidance with the gripper, while the grasping contact is defined in terms of only those points on the object belonging to the current target grasp region, not the entire part. The optimization formulation shown in the box 430 is duplicated below as Equations (1a)-(1e), and is discussed in the following paragraphs.

$$\max_{R,t,q,S^f,S^o} Q_g(S^f, S^o) \quad (1a)$$

$$\text{s.t. } S^f \subset \mathcal{T}(\partial \mathcal{F}; R, t, q) \quad (1b)$$

$$S^o = NN_{S^t}(S^f) \quad (1c)$$

$$dist(\mathcal{T}(\partial \mathcal{F}; R, t, q), O) \geq 0 \quad (1d)$$

$$(R, t, q) \in \mathcal{X} \quad (1e)$$

The optimization formulation includes an objective function (Eq. 1a) in box 432 which is defined to maximize grasp quality $Q_g$, where the grasp quality $Q_g$ is a function of the contact surfaces $S^f$ and $S^o$. The grasp quality $Q_g$ may be defined in any suitable manner. In a representative embodiment, the grasp quality $Q_g$ is the negative of the total distance between the points $p_i$ on the gripper finger surface $S^f$ and the matched nearest neighbor points NN on the object surface $S^o$. That is, $Q_g = -\Sigma_{p_i} \|p_i - NN\|$, where a smaller total sum of the distances results in a larger grasp quality $Q_g$, which means a better surface fit between the gripper and the object. In other words, a good quality grasp has a small negative value of $Q_g$, and a poor quality grasp has a large negative value of $Q_g$. In practical terms, a good quality grasp is stable, where any minor movement of the object in the gripper is quickly stopped by friction and/or normal forces and does not lead to a loss of grip.

The optimization formulation of Equations (1a)-(1e) includes constraint functions in box 434. A constraint function (Eq. 1b) defines the gripper finger surface $S^f$ in terms of the transformations ($R, t$ q). A constraint function (Eq. 1c) defines the object surface $S^o$ in terms of the nearest neighbor points NN within the target grasp region ($S^t$) in relation to the gripper finger surface $S^f$. The constraint functions in the box 434 (Equations 1b and 1c), along with the objective function in box 432, collectively lead to better surface fitting of the gripper (finger) surface $S^f$ to the object surface $S^o$, including moving the points $p_i$ on the gripper toward their nearest neighbors in the target grasp region on the object. This is shown in box 450, which corresponds with the box 350 of FIG. 3. That is, the transformations determined from the constraint functions in the box 434 cause the gripper fingers to move toward an improved surface fitting condition within the target grasp region.

A constraint function (Eq. 1d) in box 436 dictates that the transformed gripper finger surface ($\mathcal{T}(\partial \mathcal{F}; R, t, q)$) should not penetrate the object O; that is, the distance should be greater than or equal to zero. As mentioned above, the gripper-object collision or penetration can be computed with the signed distance field method, or with a point/surface model. This constraint in the box 436 leads to improved collision avoidance in the next iteration, as shown in box 460. Finally, Equation (1e) indicates that the transformations $\mathcal{T}(R, t, q)$ are elements of the feasible set $\chi$ of transformations (in one embodiment, $R$ may have any rotational value, $t$ must be within a bounding box size of the object, and q is limited by the grasp range defined in the gripper model 220).

The constraint functions of Equations (1b)-(1d) described above (in the boxes 434 and 436 of FIG. 4) are considered by penalty methods, where the constraint violations are treated as a cost function in the grasp quality calculation. That is, the greater the constraint violations, the larger the cost function, and the smaller the grasp quality. By placing constraints into costs against grasp quality, the optimization formulation shown in the box 430 can be solved by least squares.

A one-step least square linear algebra computation is performed on the optimization equations in the box 430 to identify the transformations $\mathcal{T}(S^f, q)$ which move the gripper fingers in a direction of improved grasp quality on the target grasp region while satisfying the constraint functions. Arrow 470 shows that, after calculation of the transformations $\mathcal{T}$, the grasp optimization method returns to the box 410 (where the position of the transformed gripper parts relative to the object is determined, and nearest neighbor points on the object corresponding to the gripper surface points $p_i$ are defined) and the box 420 (collisions identified). This process is repeated until the grasp position converges to a local maximum grasp quality.

After convergence to a quality grasp, the process is started over again with a new initial configuration for the same target grasp region, and this is repeated until the user-defined number of grasps for the current target grasp region (e.g., 20) is reached. As mentioned earlier, each random initial configuration may include gripper-object interference, or it may not. The initial configuration of the gripper parts with respect to the object, shown in the box 310 of FIG. 3 and the box 410 of FIG. 4, is varied randomly for each new grasp computation cycle, so that a diverse set of grasp locations on the target grasp region and grasp approach orientations is obtained. That is, for the pipe valve part having target grasp regions 252 and 254 defined, many grasps on the sector of the handle specified in the target grasp region 252 are computed (from a variety of different approach directions), and many grasps are computed on the stem/collar portion as specified in the target grasp region 254. This diversity of grasps ensures that quality grasps can be identified on parts in the bin 110 regardless of what poses the individual parts are in. All of the quality grasps computed in this way are placed into the grasp database as shown in the box 280 of FIG. 2.

The optimization computation shown in FIG. 4 and described above is one example of a grasp optimization technique. Other grasp optimization or computation formulations may be employed as appropriate, as long as a target grasp regions can be defined as geometric regions of a part where the gripper fingers are allowed to make contact.

Figure 5A:
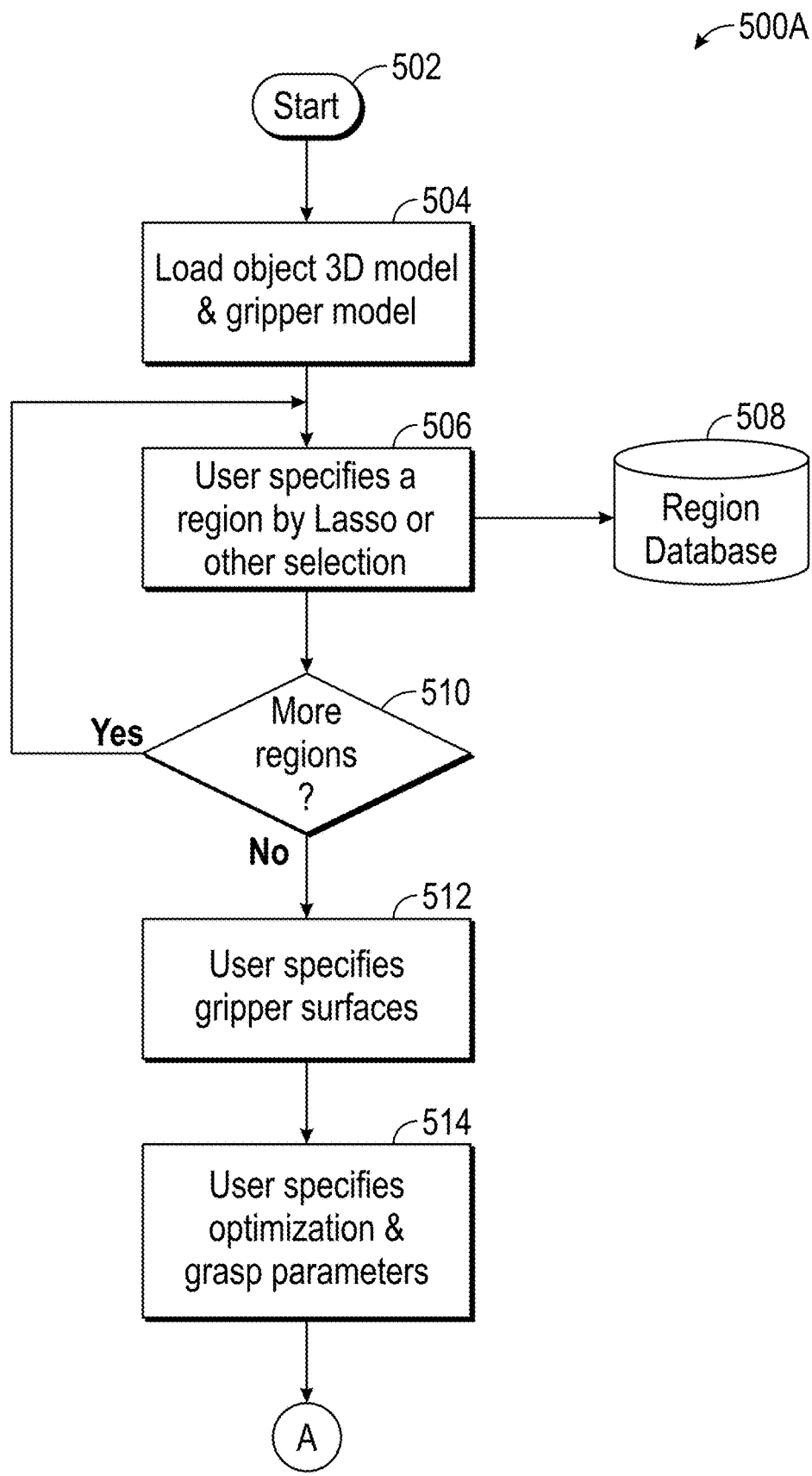
FIGS. 5A and 5B are a combined flowchart diagram of a method for region-based grasp generation, where user inputs including target grasp regions are provided in FIG. 5A, and grasp optimization calculations for the target grasp regions are performed in FIG. 5B, according to embodiments of the present disclosure.
Figure 5B:
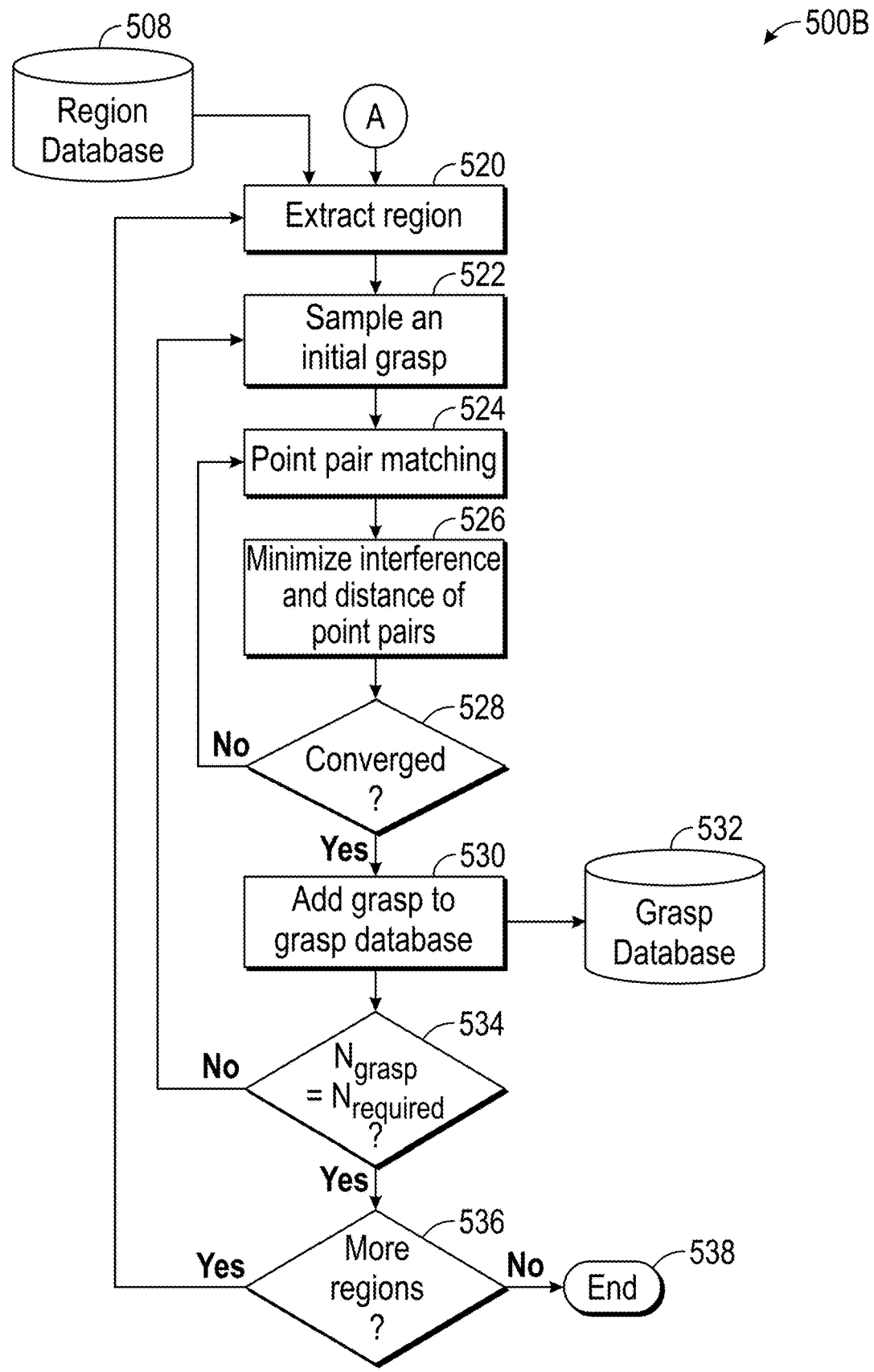

FIGS. 5A and 5B are a combined flowchart diagram (500A, 500B) of a method for region-based grasp generation, where user inputs including target grasp regions are provided in FIG. 5A, and grasp optimization calculations for the target grasp regions are performed in FIG. 5B, according to embodiments of the present disclosure.

The human expert (the user 180 of FIG. 1) begins the process at start oval 502, and proceeds to load the 3D models of the object and the gripper at box 504. These are the part model 210 and the gripper model 220 of FIG. 2 discussed earlier. The part model 210 and the gripper model 220 which are provided at the box 504 would typically be selected from a library of parts and grippers. At box 506, the user specifies a target grasp region on the part using the graphical user interface 190. The user may specify the target grasp region using commonly known solid model manipulation techniques, including selecting by a lasso-type or rectangular selection area, selecting one or more shape objects (a cylinder, a shaft, a threaded collar, etc.) from the CAD model, selecting specific surface patches from the CAD model, and other techniques as appropriate. When a target grasp region is specified on the part to the user's satisfaction at the box 506, the target grasp region is added to a region database 508—to be used later in the grasp optimization computations.

At decision diamond 510, the user is asked if more target grasp regions are to be defined. If so, the process loops back to the box 506 to allow the user to specify another target grasp region. When no more target grasp regions are needed, the process moves on to box 512, where the user specifies gripper surfaces on the gripper model 220. The gripper surfaces may be defined by selecting specific surface patches (e.g., triangular or rectangular patches on the inner finger surfaces) from the CAD model, and other techniques as appropriate. The gripper surfaces may also be pre-defined in the gripper model 220, such that the user simply has to acknowledge them.

At box 514, the user specifies other parameters needed for the optimization computation—including the number of grasps to be generated for each target grasp region. Optimization convergence parameters and other parameters can be provided at the box 514, where default values of these parameters may be selected if appropriate. The method steps of FIG. 5A correspond to the steps 200-250 along the top row of FIG. 2. The Ⓐ symbol at the bottom of FIG. 5A indicates where the human input portion of the process ends, and the process continues with the automatic grasp generation beginning at the Ⓐ symbol on FIG. 5B.

FIG. 5B is a flowchart diagram 500B of a method for automatic grasp generation as part of the region-based grasp generation techniques of the present disclosure. The flowchart diagram 500B begins where the flowchart diagram 500A ended, at the Ⓐ symbol. The region database 508 from FIG. 5A is provided at the top left of FIG. 5B. At box 520, a target grasp region is extracted from the region database 508. For example, the target grasp region 252 (a sector of the valve handle) may be selected first for grasp generation.

At box 522, an initial grasp is defined, such as by randomly sampling a pose in a spatial volume around the target grasp region, along with a grasp width. The selection of the initial grasp to be used in the optimization process was discussed above with respect to FIG. 4. At box 524, pair matching is performed to identify the nearest neighbor point on the object surface (in the target grasp region) corresponding to the points on the gripper surface. This nearest neighbor point matching was also discussed above.

At box 526, an iteration of the least-squares optimization calculation from the box 430 is performed, resulting in a transformation $\mathcal{T}$ which defines an updated pose with reduced point pair distance and reduced interference from the previous pose. At decision diamond 528, it is determined whether the optimization computation has converged—that is, whether the grasp quality of the updated pose meets the predefined grasp quality criteria. If the grasp quality criteria are not met, the process loops back to the box 524 to perform point pair matching for the updated pose, followed by recalculating the least-squares optimization using the equations in the box 430. The looping continues until the convergence criteria are met. In one exemplary embodiment, the convergence criteria is to determine whether the grasp quality is continuing to improve from one pose iteration to the next; if so, then another iteration is performed; when grasp quality drops from one pose iteration to the next, the process stops and the previous grasp iteration is used as final.

At box 530, upon convergence, the grasp (the updated pose and grasp width from the last iteration) is added to a grasp database 532. The grasp which is added to the database 532 is associated with the target grasp region upon which its calculation was based—such as the target grasp region 252. This association of a plurality of grasps to each target grasp region was shown in the box 280 of FIG. 2.

At decision diamond 534, it is determined whether the number of grasps which have been generated ($N_{grasp}$) for the current target grasp region is equal to the required number of grasps ($N_{required}$) defined as input by the user. For example, after convergence is achieved and a first grasp is added to the database 532, $N_{grasp}$=1. If more grasps are needed for the current target grasp region, such as $N_{required}$=20, then the process loops back to the box 522 where a new initial grasp is randomly sampled for the same current target grasp region. Using the new initial grasp, the optimization computation converges on a new grasp which is added to the database 532, and so on.

When the required number of grasps has been generated for the current target grasp region ($N_{grasp}=N_{required}$), the process moves on to decision diamond 536, where it is determined whether any more regions exist in the region database 508 which have not yet been extracted. If so, the process loops back to the box 520 to extract a next target grasp region for grasp generation in the manner discussed above. When no more target grasp regions exist in the region database 508, the process ends at terminus 538.

The grasp database generation of FIGS. 5A/5B is performed in an "offline" mode, in advance of actual robotic bin picking operations. The region-based grasp database generation does not require a robot, a vision system or a bin of parts, and is typically done by a computer other than a robot controller, such as the computer 160 of FIG. 1.

Upon completion of the optimization computations of the flowchart diagram 500B, the grasp database 532 is provided to a robot controller and used in live robotic bin picking operation, as shown in FIG. 1 and discussed earlier. For example, based on images from the camera 170, it may be determined that a particular part in the bin 110 is a good candidate for robotic picking using one of the grasps on the valve handle sector (the target grasp region 252) in the grasp database 532. When this is determined, the robot then moves the gripper 120 to the pose defined by the selected grasp, then closes the gripper, which accomplishes the part pick up.

The region-based grasp generation technique shown in FIGS. 2-4 has been demonstrated on a variety of real-world parts to produce a high quality grasp database—including a diversity of grasp approach directions and grasp locations on the part, while using only the target grasp regions defined by the user. The computed grasp database has also been demonstrated to enable quick and effective grasp identification in a robotic grasping system of the type shown in FIG. 1.

The grasp generation technique discussed above offers several advantages over existing methods. The disclosed methods provide high quality, full-DOF grasps with surface contacts; thus the generated grasps are robust to uncertainties and disturbances. The grasp generation method is easy to run, and runs automatically in an offline environment not requiring a robot and vision system. In addition, the disclosed methods generate diverse grasp data including different grasp locations and approach directions, thus providing many options for selecting a suitable grasp during actual bin picking operations. Finally, the disclosed grasp generation method limits the grasp locations on the part to those target grasp regions identified by a human user as being suitable for subsequent part placement in a machining station or another destination location.

Throughout the preceding discussion, various computers and controllers are described and implied. It is to be understood that the software applications and modules of these computers and controllers are executed on one or more computing devices having a processor and a memory module. In particular, this includes a processor in the robot controller 150 which controls the robot 100 performing the object grasping, and in the computer 160 which performs the region-based grasp generation computations. As discussed earlier, either the controller 150 or the computer 160 may be configured to identify objects for grasping in real time operations.

While a number of exemplary aspects and embodiments of the region-based grasp generation technique have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for generating a grasp database for use by a robotic grasping system, said method comprising:
providing an object model including three-dimensional (3D) shape data for an object to be grasped, and a gripper model including 3D shape data and actuation parameters for a gripper;
receiving input specifications from a human user, including definition of one or more target grasp regions on the object, and a required number of grasps to compute for each of the target grasp regions, where each target grasp region is a three-dimensional (3D) subpart of the object defined by techniques including selecting a component of the object model using a graphical user interface (GUI) displaying the object model and selecting a 3D volumetric sub-region of one or more components of the object model using the GUI displaying the object model;
selecting one of the target grasp regions on the object as defined by the user;
performing an iterative optimization for the selected target grasp region, using a computer having a processor and memory, where the iterative optimization converges to a grasp having a locally-maximum quality while satisfying constraint equations which define surface contact between the gripper and the selected target grasp region of the object without gripper-object interference;
outputting data defining the grasp to the grasp database;
repeatedly performing the iterative optimization and outputting the data defining the grasp until the required number of grasps is met; and
selecting another one of the target grasp regions and repeatedly performing the iterative optimization to compute the required number of grasps until all of the target grasp regions are used.

2. The method according to claim 1 wherein performing an iterative optimization includes randomly initializing a gripper position relative to the selected target grasp region on the object for a first iteration of the optimization for each of the required number of grasps.

3. The method according to claim 1 further comprising using the grasp database during live robotic operations to identify a target object to grasp from a container of objects, including estimating object poses by comparing depth images from a 3D camera to the object model, selecting the target object by mapping grasps from the grasp database onto the estimated object poses, and providing target object grasp data to a robot controller which instructs a robot fitted with the gripper to grasp and move the target object.

4. The method according to claim 3 wherein the target object is placed by the robot in a destination pose, and the one or more target grasp regions are chosen by the human user to enable placement of the target object in the destination pose without interference by the gripper.

5. The method according to claim 1 wherein the data defining the grasp includes 3D coordinates of a grasp target point, an angle of approach to be followed by the gripper, a gripper angle of rotation, a gripper width and a grasp quality value.

6. The method according to claim 1 wherein the iterative optimization is formulated including a gripper surface defined in terms of sampling points on surfaces of the gripper model, and an object surface defined in terms of sampling points on surfaces of the object model in the target grasp region, including a nearest neighbor point on the object surface corresponding with each of the sampling points on the gripper surface.

7. The method according to claim 6 wherein the gripper surface is transformed at each iteration by a transformation including a rotation, a translation and a change in gripper width.

8. The method according to claim 7 wherein the iterative optimization is formulated including an objective function which maximizes a grasp quality defined based on a total distance between each sampling point on the gripper surface and its corresponding nearest neighbor point on the object surface in the target grasp region, where the constraint equations are treated as penalty functions whereby constraint violations reduce the grasp quality, and each iteration computes the transformation in one step using a least square linear algebra computation.

9. The method according to claim 6 wherein the iterative optimization is formulated including a constraint equation which specifies that the gripper surface does not penetrate the object surface.

10. The method according to claim 1 wherein definition of the one or more target grasp regions selected by the user includes using the GUI to select geometric elements of the object model, including one or more surface elements or solid elements.

11. A method for generating a grasp database for use by a robotic grasping system, said method comprising:
defining one or more target grasp regions on a three-dimensional (3D) object model of an object to be grasped, where each target grasp region is a three-dimensional (3D) subpart of the object defined by techniques including selecting a component of the object model using a graphical user interface (GUI) displaying the object model and selecting a 3D volumetric sub-region of one or more components of the object model using the GUI displaying the object model; and for each of the target grasp regions, computing a predefined required number of grasps, using a computer having a processor and memory, using an iterative optimization which converges to a grasp meeting a quality threshold while satisfying constraint equations which define surface contact between the gripper and the target grasp region of the object without gripper-object interference, and outputting each grasp to the grasp database.

12. A robotic grasp generation system comprising:

an interface device for receiving input from a human user; and a computer having a processor and memory, said computer communicating with the interface device and configured to generate a grasp database, where the human user provides, using the interface device, an object model including three-dimensional (3D) shape data for an object to be grasped, and a gripper model including 3D shape data and actuation parameters for a gripper, and the human user provides input specifications including definition of one or more target grasp regions on the object, and a required number of grasps to compute for each of the target grasp regions, where each target grasp region is a three-dimensional (3D) subpart of the object defined by techniques including selecting a component of the object model using graphical user interface (GUI) software displaying the object model on the interface device and selecting a 3D volumetric sub-region of one or more components of the object model using the GUI software displaying the object model, and where the computer is configured to generate a grasp database, including;

selecting one of the target grasp regions on the object as defined by the user;

performing an iterative optimization for the selected target grasp region, where the iterative optimization converges to a grasp having a locally-maximum quality while satisfying constraint equations which define surface contact between the gripper and the selected target grasp region of the object without gripper-object interference;

outputting data defining the grasp to the grasp database;

repeatedly performing the iterative optimization and outputting the data defining the grasp until the required number of grasps is met; and selecting another one of the target grasp regions and repeatedly performing the iterative optimization to compute the required number of grasps until all of the target grasp regions are used.

13. The system according to claim 12 further comprising:
a robot controller;
a 3D camera providing depth images of a container of objects during live robotic operations, where the computer or the robot controller identifies a target object to grasp from the container of objects, including estimating object poses by comparing the depth images to the object model, and selecting the target object by mapping grasps from the grasp database onto the object poses; and
a robot fitted with the gripper to grasp and move the target object based on commands from the controller.

14. The system according to claim 13 wherein the target object is placed by the robot in a destination pose, and the one or more target grasp regions are chosen by the human user to enable placement of the target object in the destination pose without interference by the gripper.

15. The system according to claim 12 wherein the data defining the grasp includes 3D coordinates of a grasp target point, an angle of approach to be followed by the gripper, a gripper angle of rotation, a gripper width and a grasp quality value.

16. The system according to claim 12 wherein performing an iterative optimization includes randomly initializing a gripper position relative to the selected target grasp region on the object for a first iteration of the optimization for each of the required number of grasps.

17. The system according to claim 12 wherein the iterative optimization is formulated including a gripper surface defined in terms of sampling points on surfaces of the gripper model, and an object surface defined in terms of sampling points on surfaces of the object model in the target grasp region, including a nearest neighbor point on the object surface corresponding with each of the sampling points on the gripper surface, and where the gripper surface is transformed at each iteration by a transformation including a rotation, a translation and a change in gripper width.

18. The system according to claim 17 wherein the iterative optimization is formulated including an objective function which maximizes a grasp quality defined based on a total distance between each sampling point on the gripper surface and its corresponding nearest neighbor point on the object surface in the target grasp region, where the constraint equations are treated as penalty functions whereby constraint violations reduce the grasp quality, and each iteration computes the transformation in one step using a least square linear algebra computation.

19. The system according to claim 17 wherein the iterative optimization is formulated including a constraint equation which specifies that the gripper surface does not penetrate the object surface.

20. The system according to claim 12 wherein definition of the one or more target grasp regions selected by the user includes using the GUI software on the interface device to select geometric elements of the object model, including one or more surface elements or solid elements.

* * * * *